July 6, 1937.  J. W. BOOMER, SR  2,086,460
MILK BOTTLE TRAP
Filed March 30, 1936   2 Sheets-Sheet 1
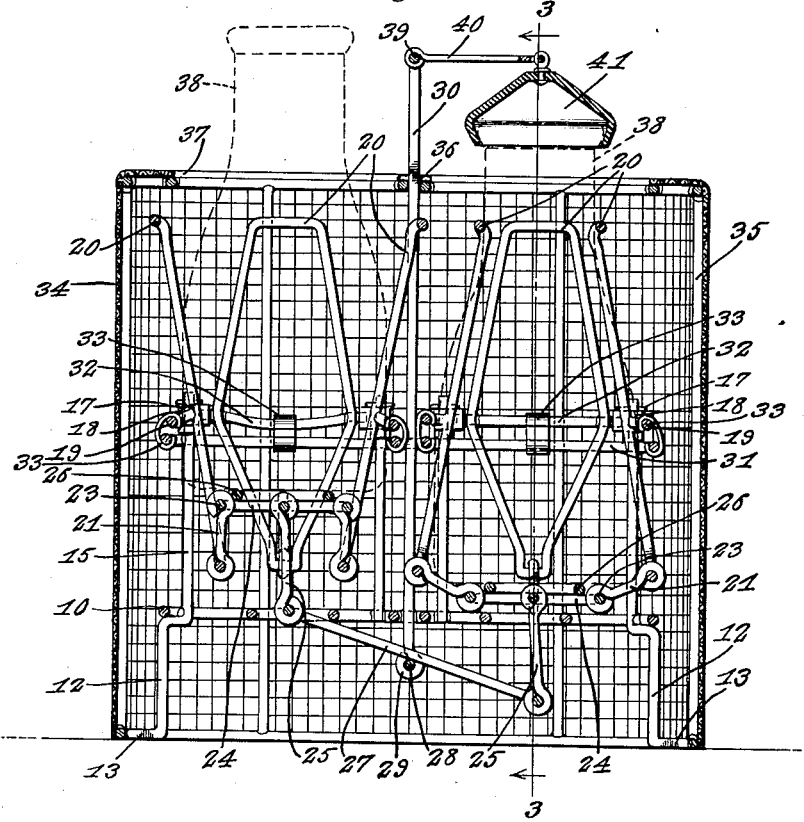
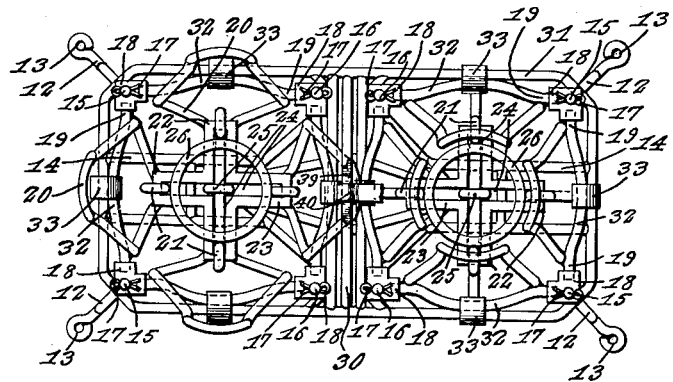
John W. Boomer, Sr., INVENTOR
BY Victor J. Evans & Co.
ATTORNEY July 6, 1937.  J. W. BOOMER, SR  2,086,460
MILK BOTTLE TRAP
Filed March 30, 1936  2 Sheets-Sheet 2
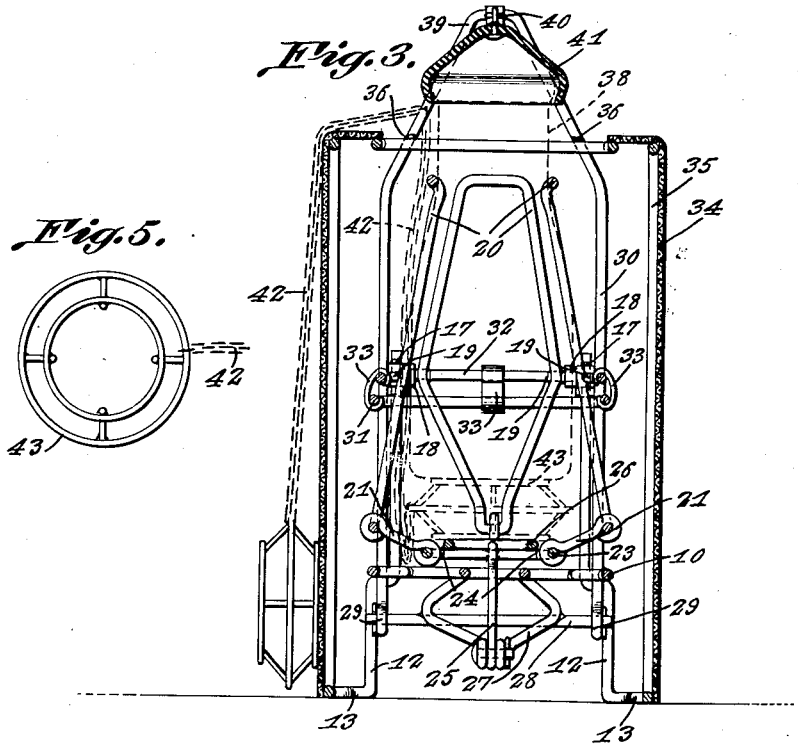
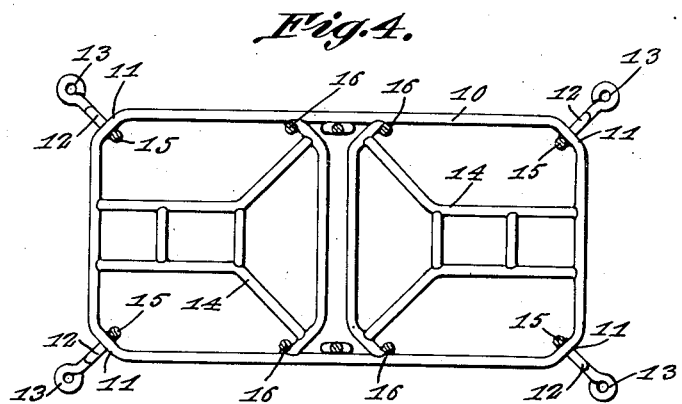
John W. Boomer, Sr., INVENTOR
BY Victor J. Evans & Co.
ATTORNEY Patented July 6, 1937

2,086,460

UNITED STATES PATENT OFFICE 2,086,460

MILK BOTTLE TRAP

John W. Boomer, Sr., Pontiac, Mich.

Application March 30, 1936, Serial No. 71,778

4 Claims. (Cl. 232—41)

The invention relates to a bottle trap and more especially to a receiver for milk bottles.

The primary object of the invention is the provision of a receiver of this character, wherein an exchange of empty milk bottles for filled ones can be effected and such bottles when therein will be protected in that the receiver is adapted to be placed out of doors for the expeditious handling of such bottles through milk delivery service, there being less likelihood of the theft of the bottles either filled or empty when within the receiver.

It is customary by milk deliverymen of exchanging a filled milk bottle for an empty one and by a receiver of this character the empty milk bottle can be placed therein and held clamped when within said receiver so that when the deliveryman delivers a filled milk bottle it can be placed in the receiver and in doing this the empty milk bottle is released for collection by such deliveryman while the filled milk bottle deposited will be clamped within said receiver and in this fashion certain protection is afforded both to the filled and empty bottles.

Another object of the invention is the provision of a receiver of this character, wherein the same is automatic in its working in that by the exchange of bottles the one deposited within the receiver will be clamped therein and protected to a degree against theft in that it will require the placing of a substitute bottle for each bottle within said receiver before the latter can be removed therefrom and in this manner there is less likelihood or danger of the bottles being stolen.

A further object of the invention is the provision of a receiver of this character, which is comparatively simple in its construction, thoroughly reliable and effective in its operation, automatic in its working, durable, strong, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a vertical sectional view through the receiver constructed in accordance with the invention showing by dotted lines one bottle clamped therein and another released.

Figure 2 is a top plan view with the screen casing removed.

Figure 3 is a sectional view on the line 3—3 of Figure 1 looking in the direction of the arrows.

Figure 4 is a top plan view of the supporting base of the receiver.

Figure 5 is a plan view of an adapter as employed with the receiver.

Similar reference characters indicate corresponding parts throughout the several views in the drawings.

Referring to the drawings in detail, the receiver comprises a main base stand including a substantially rectangular shaped frame 10 preferably made from stiff wire having the angled corners 11 to which are attached legs or feet 12 to elevate the frame 10 the desired height with respect to a support or foundation. These legs or feet are formed with eyes 13 adapted to accommodate fasteners if desired to secure the stand fixed upon a support or foundation. The frame 10 has built therein a grating 14 disposed in the same plane with said frame and the feet or legs at the corners thereof are extended upwardly to provide vertical uprights or posts 15 while soldered or otherwise fixed intermediate of the frame 10 to the sides thereof are supplemental uprights or posts 16. The posts 15 and 16 extend vertically at a uniform height with respect to each other.

Fastened on the upper ends of the posts 15 and 16 by cotter pins 17 are bearings 18 in which are journaled rocking shafts 19, there being four of these shafts at each side of the transverse center of the stand. The shafts 19 have fixed thereto opposed pairs of clamping jaws 20 which are shaped for accommodating therebetween a milk bottle of a quart size. The jaws 20 extend above and below the shafts 19 while loosely connected to the lower ends of the jaws are links 21, these being loosely connected to the arms 22 of four-armed spiders 23. The arms 22 of the spiders 23 disposed longitudinally of the stand are provided with slots 24 forming clearances for vertical linkage 25 connecting presser rings 26 with a rocker 27, the linkage 25 being adapted to play freely through the spiders 23 for a purpose presently described. The rocker has an intermediate pivot axle 28 journaled in hangers 29 formed at the lower ends of a vertically disposed bail 30 its side arms being soldered or made fast to the frame 10 and also to a superframe 31 similar to the said frame 10 but spaced vertically a distance from the latter. This superframe 31 is made fast to the posts 15 and 16 in any suitable manner and is disposed horizontally in parallel relation to the frame 10.

The rocking shafts 19 are formed with the outwardly bowed intermediate portions 32 and with these and the said superframe are engaged inherently resilient clips 33 which effect tension upon the jaws 20 when opened and closed.

Adapted to be disposed about the stand is a wire screen housing 34, it extending above the upper ends of the jaws and its frame 35 is separably attached to the bail by cotter pins 36, the top portion of the housing being provided with the openings 37 to permit the introduction of milk bottles 38 between the jaws 20 and the removal of such bottles therefrom when such jaws are in open position.

The bail 30 at its upper handle end 39 carries a swinging arm 40 loosely supporting a closure cap 41 adapted to fit the mouth of either bottle 38 when placed within the receiver, the cap 41 being shown in Figure 1 of the drawings applied to the bottle and this cap 41 is applicable to a filled bottle when within the said receiver. The handle 39 of the bail 30 projects considerably above the upper end of the housing 34 and thus enables the hand carrying of the receiver.

The size of the jaws 20 and the shape thereof are such as to accommodate a quart size milk bottle. Now to permit the receiver to accommodate pint size bottles through a flexible chain 42 connected to the bail 30 there is carried an adapter 43 which can be placed within the receiver onto either of the rings 26 so that a pint size milk bottle will be promptly accommodated in the jaws to be clamped by the same.

In the use of the device an emptied milk bottle is inserted through one of the openings 37 in the housing 34 and lowered between one set of jaws 20, there being two sets of jaws within the housing 34 and both sets are aligned with the openings 37. When the emptied milk bottle is lowered onto the ring 26 the latter is depressed actuating the links 21 to throw this set of jaws 20 into clamping engagement with the bottle 38. This causes the rocker 27 to swing and thus under its action the other set of jaws will be moved to open position and the ring 26 common thereto will be raised so that when a filled milk bottle is placed within the receiver and clamped by the open set of jaws the empty milk bottle will be freed so that it can be removed while the filled milk bottle will be clamped within the receiver. The two sets of jaws alternately operate in the opening and closing thereof for the clamping and unclamping of two milk bottles, the receiver being built adaptable for the reception and delivery of the two bottles.

The adapter 43 when not in use is hung outside of the housing 34 as is clearly shown by full lines in Figure 3 of the drawings while the service of such adapter in its use is shown by dotted lines in said Figure 3.

The screen housing 34 is a protective casing and eliminates the possibility of tampering with the parts of the receiver for hand operating the same. The jaws 20 are automatically operated by the insertion of the bottle 38 in either set of jaws of said receiver through one of the openings 37 in the housing 34.

The receiver not only insures security of the filled and empty bottles from theft and protection from contamination but it is also an absolute check upon the exchange of empty bottles for filled ones and vice versa, making it necessary for the householder to deposit an empty bottle in the receiver before obtaining a filled one and likewise for the tradesman to deposit a filled bottle before getting the empty one.

What is claimed is:

1. A trap for milk bottles and the like comprising an open topped receptacle for receiving two bottles, a rock lever pivotally supported in the receptacle, a set of jaws at each end of the rock lever, each set of jaws being adapted to receive and clamp a bottle, a spider for each set of jaws, links connecting the spider with the jaw of its set for closing the jaw upon movement of the spider, a presser ring for moving the spider, and each presser ring having a link connecting it with the rock lever at the corresponding end whereby alternate operation of the jaw is effected.

2. A trap for milk bottles and the like comprising an open topped receptacle for receiving two bottles, a rocking lever pivotally supported in the receptacle, a spider member connected with each end of said lever adapted to be engaged by the bottom of a milk bottle or the like, a set of clamping jaw members above each spider for clamping a bottle supported on the spider, links connected between each spider and the clamping members associated above the spiders, said links operable to draw the set of clamping members into clamping position when a bottle is placed on a spider and depressed to its lower position with the rocking arm and thereby elevating the spider on the other end of the rocking lever and said elevated lever through its link connection with its associate clamping members adapted to operate the clamping members to released position and to elevate a bottle supported by the spider to a position for removal from the top of the receptacle.

3. In combination with a trap for milk bottles and the like in accordance with claim 2, an adapter for positioning on each spider comprising supplementing members extending upwardly from each spider for engagement by the bottoms of smaller size bottles so as to properly position such bottles in the receptacle and effect the clamping action of the clamping jaw members on such smaller bottles when the spider is depressed by a bottle.

4. In combination with a trap for milk bottles and the like in accordance with claim 2, a bale connected with the pivot support for the rocking lever and extending upward through the open top of the receptacle and terminating in a handle at its upper end, and connecting means between the upper portion of the receptacle and the bale maintaining the receptacle assembled over the bottle receiving and clamping members.

JOHN W. BOOMER, Sr.